United States Patent
Lee et al.

(10) Patent No.: US 8,742,664 B2
(45) Date of Patent: Jun. 3, 2014

(54) APPARATUS AND METHOD FOR CONTROLLING ROOM LAMP OF VEHICLE

(75) Inventors: Sang Ho Lee, Daegu (KR); Ho Geun Lee, Daejeon (KR); Jang Sik Bae, Daegu (KR); Kyu Hyung Kim, Daegu (KR)

(73) Assignee: Intellectual Discovery Co., Ltd., Seoul (KR)

( * ) Notice: Subject to any disclaimer, the term of this patent is extended or adjusted under 35 U.S.C. 154(b) by 175 days.

(21) Appl. No.: 13/311,482

(22) Filed: Dec. 5, 2011

(65) Prior Publication Data

US 2012/0139415 A1 Jun. 7, 2012

(30) Foreign Application Priority Data

Dec. 6, 2010 (KR) .................. 10-2010-0123737

(51) Int. Cl.
*B60Q 1/26* (2006.01)
(52) U.S. Cl.
USPC .............. 315/79; 315/84; 362/464; 362/488

(58) Field of Classification Search
USPC .............. 315/77, 79, 84; 362/464, 487–488
See application file for complete search history.

(56) References Cited

U.S. PATENT DOCUMENTS

| | | | | |
|---|---|---|---|---|
| 6,179,453 | B1 * | 1/2001 | McMahon | 362/490 |
| 6,343,869 | B1 * | 2/2002 | Kobayashi | 362/37 |
| 7,106,005 | B2 * | 9/2006 | Tsuchiya et al. | 315/77 |
| 7,344,284 | B2 * | 3/2008 | Lynam et al. | 362/345 |
| 2009/0066255 | A1 * | 3/2009 | Nakayama et al. | 315/77 |

FOREIGN PATENT DOCUMENTS

KR 2009-0060638 A 6/2009

* cited by examiner

*Primary Examiner* — Jason M Crawford
(74) *Attorney, Agent, or Firm* — Rabin & Berdo, P.C.

(57) ABSTRACT

Disclosed are an apparatus and a method for controlling a room lamp of a vehicle. The present invention relates to collecting information associated with the vehicle and information associated with an ambient environment using a global positioning system (GPS) or a controller area network (CAN) and then controlling the room lamp using at least one of turn-off of the room lamp, change of an irradiation angle of the room lamp, and adjustment of illumination of the room lamp based on the collected information.

16 Claims, 3 Drawing Sheets

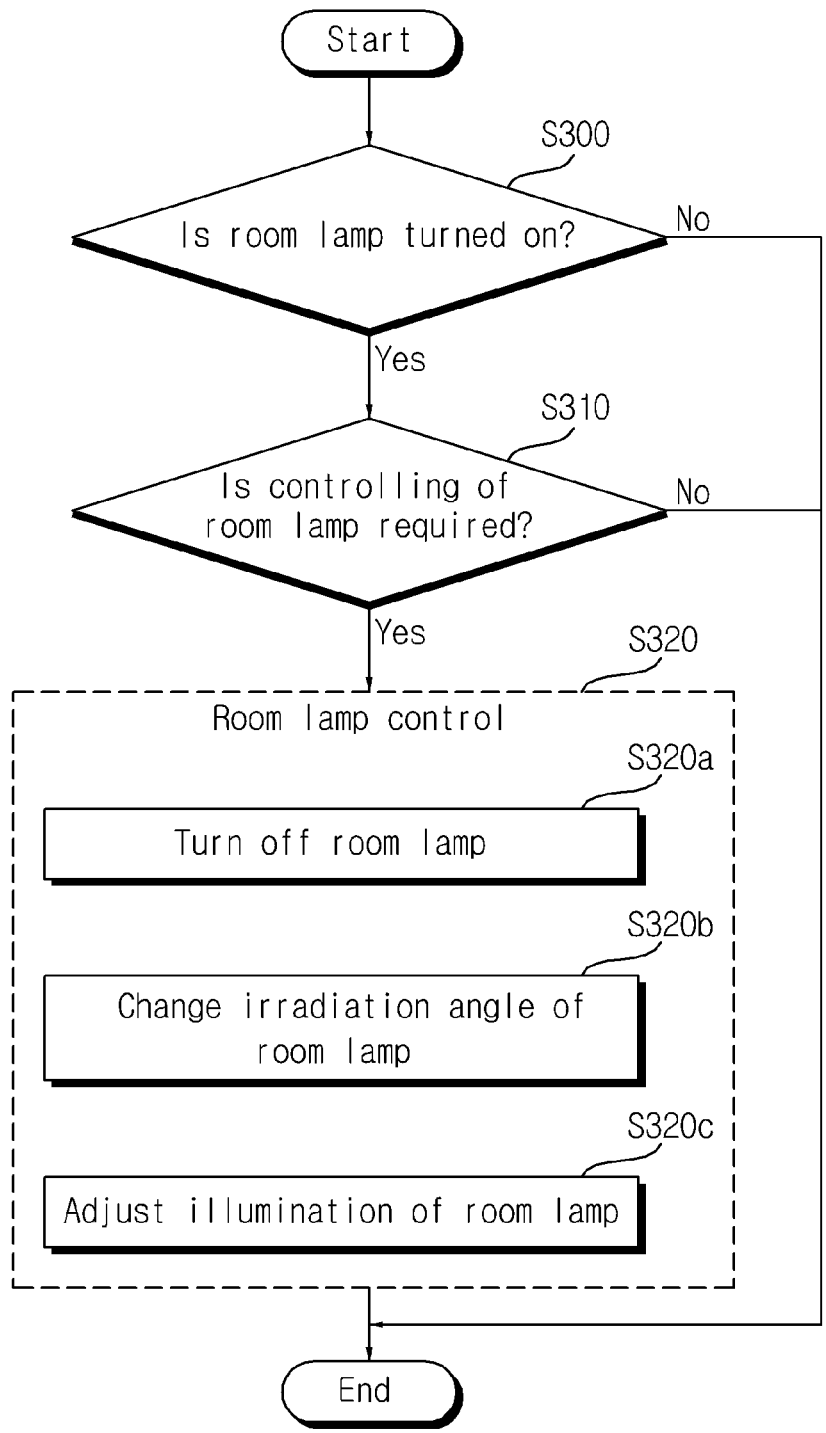

APPARATUS AND METHOD FOR CONTROLLING ROOM LAMP OF VEHICLE

CROSS-REFERENCE TO RELATED APPLICATIONS

This application claims priority to and the benefit of Korean Patent Application No. 10-2010-0123737 filed in the Korean Intellectual Property Office on Dec. 6, 2010, the entire contents of which are incorporated herein by reference.

TECHNICAL FIELD

The present invention relates to an apparatus and a method for controlling a room lamp, and more particularly, to an apparatus and a method for controlling a room lamp of a vehicle.

BACKGROUND ART

In general, a room lamp of a vehicle includes a function of manually controlling a button and the like based on user convenience or turning on the room lamp when a door of the vehicle is opened. Currently, the room lamp of the vehicle includes a function of turning off the room lamp while automatically decreasing illumination of the room lamp slowly when the door of the vehicle is closed. Further, the room lamp that does not interfere with a driver by transforming a housing of the room lamp of the vehicle has been invented.

However, the room lamp of the related art does not adaptively cope with a light change in an environment of the vehicle, which may cause user inconvenience. For example, when children ride together, a driver usually turns on the room lamp while driving at night. In this case, it is highly probable that the driver may feel eye fatigue caused by the room lamp or that a reaction velocity of the driver may become slow due to light reflection resulting from the room lamp. Further, when a scanning direction of light of the room lamp is not consistently oriented to the driver due to a housing of the room lamp, the room lamp may not irradiate light with the high illumination toward the driver when stopping.

SUMMARY OF THE INVENTION

The present invention has been made in an effort to provide an apparatus and a method for controlling a room lamp that may automatically turn off the room lamp or control an irradiation direction or illumination of the room lamp when the vehicle is driven at night.

An exemplary embodiment of the present invention provides an apparatus for controlling a room lamp, including: a room lamp state determining unit to determine whether a room lamp of a vehicle being driven is turned on; a room lamp control determining unit to determine whether to control the room lamp of the vehicle based on first information associated with the vehicle or second information associated with an ambient environment, when the room lamp is turned on; and a room lamp control unit to control the room lamp by controlling a driver who drives the vehicle not to recognize that the room lamp is turned on, when controlling of the room lamp is required.

The room lamp control unit may include at least one of a turn-off unit to turn off the room lamp, an irradiation angle change unit to change an irradiation angle of the room lamp, and an illumination adjustment unit to adjust illumination of the room lamp. The turn-off unit may include a turn-off control unit to control turn-off of the room lamp, and a room lamp turn-off unit to turn off the room lamp according to control of the turn-off control unit, the irradiation angle change unit may include an irradiation angle change control unit to control changing of the irradiation angle of the room lamp, and a room lamp irradiation angle change unit to change the irradiation angle of the room lamp according to control of the irradiation angle change control unit, and the illumination adjustment unit may include an illumination adjustment control unit to control adjusting of the illumination of the room lamp, and a room lamp illumination adjustment unit to adjust the illumination of the room lamp according to control of the illumination adjustment control unit.

The irradiation angle change unit may change the irradiation angle of the room lamp into another direction until a light of the room lamp does not reach a visual field of the driver viewing in one direction any more. The irradiation angle change unit may change the irradiation angle of the room lamp to be 15 degrees to 80 degrees toward a rear of the vehicle.

The illumination control unit may adjust the illumination of the room lamp to be 10% to 50% of a reference value.

The room lamp control determining unit may use a velocity of the vehicle as the first information and may use an external brightness value of the vehicle or a current time as the second information. When using the velocity of the vehicle as the first information, the room lamp control unit may change an irradiation angle level of the room lamp or may adjust an illumination level of the room lamp based on a position of an acceleration value that is based on at least one predetermined reference value, or based on whether a current velocity value is within a predetermined reference range compared to a previous velocity value. The room lamp control apparatus may further include a global positioning system (GPS) communication unit to receive information about the velocity of the vehicle or information about the current time; or a controller area network (CAN) communication unit to receive information about the velocity of the vehicle or information about the external brightness value of the vehicle.

The room lamp state determining unit may determine whether the room lamp is turned on based on at least one of a result value that is input after a person who is riding in the vehicle being driven verifies whether the room lamp is turned on, and a result value that is obtained by sensing a current state of a switch that is used when turning on or turning off the room lamp.

The room lamp control apparatus may be mounted within the room lamp or on one side of the vehicle within a predetermined distance from the room lamp.

Another exemplary embodiment of the present invention provides a method for controlling a room lamp, including: a room lamp state determining operation of determining whether a room lamp of a vehicle being driven is turned on; a room lamp control determining operation of determining whether to control the room lamp of the vehicle based on first information associated with the vehicle or second information associated with an ambient environment, when the room lamp is turned on; and a room lamp control operation of controlling the room lamp by controlling a driver who drives the vehicle not to recognize that the room lamp is turned on, when controlling of the room lamp is required.

The room lamp control operation may include at least one of a turn-off operation of turning off the room lamp, an irradiation angle change operation of changing an irradiation angle of the room lamp, and an illumination adjustment operation of adjusting illumination of the room lamp. The turn-off operation may turn off the room lamp according to control of a turn-off control unit that is configured to control turn-off of the room lamp, the irradiation angle change operation may change the irradiation angle of the room lamp according to control of an irradiation angle change control unit that is configured to control changing of the irradiation angle of the room lamp, and the illumination adjustment operation may adjust the illumination of the room lamp according to control of an illumination adjustment control unit that is configured to control adjusting of the illumination of the room lamp. The irradiation angle change operation may change the irradiation angle of the room lamp into another direction until a light of the room lamp does not reach a visual field of the driver viewing in one direction any more.

The room lamp control determining operation may use a velocity of the vehicle as the first information and may use an external brightness value of the vehicle or a current time as the second information. When using the velocity of the vehicle as the first information, the room lamp control operation may change an irradiation angle level of the room lamp or may adjust an illumination level of the room lamp based on a position of an acceleration value that is based on at least one predetermined reference value, or based on whether a current velocity value is within a predetermined reference range compared to a previous velocity value.

The room lamp state determining operation may determine whether the room lamp is turned on based on at least one of a result value that is input after a person who is riding in the vehicle being driven verifies whether the room lamp is turned on, and a result value that is obtained by sensing a current state of a switch that is used when turning on or turning off the room lamp.

The room lamp control method may further include: a GPS information receiving operation of receiving information about the velocity of the vehicle as the first information and receiving information about the current time as the second information using a GPS; or a CAN information receiving operation of receiving information about the velocity of the vehicle as the first information and information about the external brightness value of the vehicle as the second information using a CAN. The GPS information receiving operation or the CAN information receiving operation may be configured as an intermediate operation between the room lamp state determining operation and the room lamp control determining operation.

According to exemplary embodiments of the present invention, the following effects may be obtained by automatically turning off a room lamp or by adjusting an irradiation direction or illumination of the room lamp when the vehicle is being driven at night. First, even though a driver is driving at night or in a dark place, it is possible to prevent interference with driving due to light of the room lamp. Second, it is possible to remove inconvenience in that the driver needs to control the room lamp.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 3 is a flowchart illustrating a method of controlling a room lamp according to an exemplary embodiment of the present invention.

Figure 1:
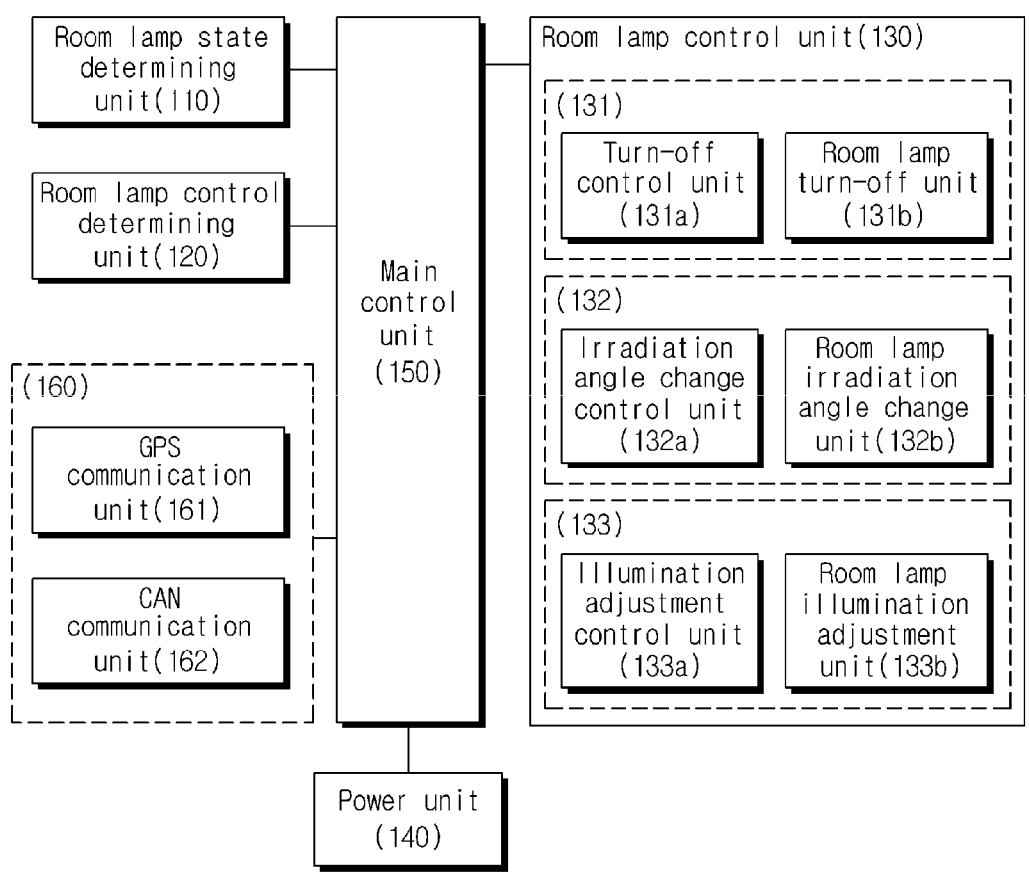
FIG. 1 is a block diagram schematically illustrating an apparatus for controlling a room lamp according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

FIG. 1 is a block diagram schematically illustrating an apparatus for controlling a room lamp according to an exemplary embodiment of the present invention. Referring to FIG. 1, a room lamp control apparatus 100 includes a room lamp state determining unit 110, a room lamp control determining unit 120, a room lamp control unit 130, a power unit 140, and a main control unit 150.

The room lamp control apparatus 100 is to control a room lamp of a vehicle and thus, may be mounted within the room lamp or on one side of the vehicle within a predetermined distance from the room lamp. In the exemplary embodiment, the room lamp control apparatus 100 may be mounted within the room lamp or within a distance of 1 m from the room lamp, in consideration of a smooth drive of a controller area network (CAN) and the like.

The room lamp state determining unit 110 functions to determine whether the room lamp of the vehicle being driven is turned on.

The room lamp state determining unit 110 may determine whether the room lamp is turned on based on at least one of a result value that is input after a person who is riding in the vehicle being driven verifies whether the room lamp is turned on, and a result value that is obtained by sensing a current state of a switch that is used when turning on or turning off the room lamp.

The room lamp control determining unit 120 functions to determine whether to control the room lamp of the vehicle based on first information associated with the vehicle or second information associated with an ambient environment, when the room lamp is turned on.

The room lamp control determining unit 120 uses a velocity of the vehicle as first information and uses an external brightness value of the vehicle or a current time as second information. In the exemplary embodiment, it is possible to control the room lamp of the vehicle when a measured external brightness value of the vehicle is greater than or equal to 3 cd to 5 cd. During a summer season, it is possible to control the room lamp of the vehicle when the current time passes 7:30 pm. During a winter season, it is possible to control the room lamp of the vehicle when the current time passes 5:45 pm. The aforementioned brightness value or current time is only an example and thus, the exemplary embodiment is not limited thereto.

The room lamp control unit 130 functions to control the room lamp when controlling of the room lamp is required. The room lamp control unit 130 may control a driver who drives the vehicle not to recognize that the room lamp is turned on.

The room lamp control unit 130 may include at least one of a turn-off unit 131, an irradiation angle change unit 132, and an illumination adjustment unit 133. The turn-off unit 131 functions to turn off the room lamp. In the exemplary embodiment, the turn-off unit 131 may include a turn-off control unit 131a and a room lamp turn-off unit 131b. The turn-off control unit 131a controls turn-off of the room lamp. The room lamp turn-off unit 131b turns off the room lamp according to control of the turn-off control unit 131a. The irradiation angle change unit 132 functions to change an irradiation angle of the room lamp. In the exemplary embodiment, the irradiation angle change unit 132 may include an irradiation angle change control unit 132a and a room lamp irradiation angle change unit 132b. The irradiation angle change control unit 132a controls changing of the irradiation angle of the room lamp. The room lamp irradiation angle change unit 132b changes the irradiation angle of the room lamp according to control of the irradiation angle change control unit 132a. The illumination adjustment unit 133 functions to adjust illumination of the room lamp. In the exemplary embodiment, the illumination adjustment unit 133 may include an illumination adjustment control unit 133a and a room lamp illumination adjustment unit 133b. The illumination adjustment control unit 133a controls adjusting of the illumination of the room lamp. The room lamp illumination adjustment unit 133b adjusts the illumination of the room lamp according to control of the illumination adjustment control unit 133a.

The irradiation angle change unit 132 changes the irradiation angle of the room lamp into another direction until a light of the room lamp does not reach a visual field of the driver viewing in one direction any more. The irradiation angle change unit 132 may change the irradiation angle of the room lamp to be 15 degrees to 80 degrees toward a rear of the vehicle. When changing the irradiation angle of the room lamp to be within 15 degrees toward the rear of the vehicle, light of the room lamp reaches the visual field of the driver and thus may become a driving interference factor. Even when changing the irradiation angle of the room lamp toward both sides of the vehicle, the same issue may occur. When changing the irradiation angle of the room lamp to be greater than or equal to 80 degrees toward the rear of the vehicle, there occurs the same effect as if the room lamp is turned off. Thus, in this case, it is desirable to turn off the room lamp in consideration of energy saving. Accordingly, in the exemplary embodiment, it is desirable to change the irradiation angle of the room lamp to be 15 degrees to 80 degrees toward the rear of the vehicle in order not to interfere with the driver driving with the room lamp turned on.

The illumination adjustment unit 133 adjusts the illumination of the room lamp to be 10% to 50% of the reference value. Here, the reference value indicates a brightness value when the room lamp is usually turned on. When the illumination of the room lamp is adjusted to be greater than or equal to 50% of the reference value, light of the room lamp may cause the interference with the driving. When the illumination of the room lamp is adjusted to be less than or equal to 10%, there occurs the same effect as if the room lamp is turned off. Accordingly, in the exemplary embodiment, the illumination of the room lamp may be adjusted to be 10% to 50% of the reference value in consideration of the above aspects.

Meanwhile, when using the velocity of the vehicle as the first information, the room lamp control unit 130 may change an irradiation angle level of the room lamp or may adjust an illumination level of the room lamp based on a position of an acceleration value that is based on at least one predetermined reference value, or based on whether a current velocity value is within a predetermined reference range compared to a previous velocity value. When a single reference value is used for the acceleration value, let us assume this reference value as 4 m/sec$^2$. When a measured acceleration value is greater than or equal to the reference value, the room lamp control unit 130 changes the irradiation angle of the room lamp or adjusts the illumination of the room lamp. When the measured acceleration value is less than the reference value, the room lamp control unit 130 does not control the room lamp. In the meantime, in the exemplary embodiment, at least two reference values may be used for the acceleration value. For example, let us assume that a first reference value is 3 m/sec$^2$ and a second reference value is 5 m/sec$^2$. When the measured acceleration value is less than the first reference value, the room lamp control nit 130 does not control the room lamp. On the other hand, when the measured acceleration value is greater than or equal to the first reference value and less than the second reference value, the room lamp control unit 130 changes the irradiation angle of the room lamp to be 15 degrees to 45 degrees toward the rear of the vehicle, or adjusts the illumination of the room lamp to be 30% to 50% of the reference value. When the measured acceleration value is greater than or equal to the second reference value, the room lamp control unit 130 changes the irradiation angle of the room lamp to be 45 degrees to 80 degrees toward the rear of the vehicle or adjusts the illumination of the room lamp to be 10% to 30% of the reference value. Meanwhile, in the exemplary embodiment, the reference value is not limited to a predetermined value (ex., 30 degrees) and thus, may be set to be within the range (ex., 30 degrees to 40 degrees) including predetermined values.

The room lamp control unit 130 may also control the room lamp according to a change in a velocity value of the vehicle. In the exemplary embodiment, when a difference between a previous velocity value and a current velocity value is within a predetermined reference range by comparing the previous velocity value and the current velocity value, the room lamp control unit 130 may not control the room lamp. Let us assume that the reference range is 10% to 15%. When the previous velocity value is 50 km/h and the current velocity value is 55 km/h to 57.5 km/h, the room lamp control unit 130 may not control the room lamp. When the current velocity value is greater than or equal to 57.5 km/h, the room lamp control unit 130 may control the irradiation angle level or the illumination level of the room lamp based on how much the velocity value is. When the current velocity value is less than or equal to the previous velocity value, the room lamp is not controlled.

The power unit 140 functions to supply power to each of the units that constitute the room lamp control apparatus 100.

The main control unit 150 functions to control the overall operation of each of the units that constitute the room lamp control apparatus 100.

The room lamp control apparatus 100 may further include a communication unit 160 that includes a global positioning system (GPS) communication unit 161 or a CAN communication unit 162. In the exemplary embodiment, when first information is information about the velocity of the vehicle and second information is information about the external brightness value of the vehicle or information about the current time, the GPS communication unit 161 functions to receive information about the velocity of the vehicle or information about the current time. On the other hand, the CAN communication unit 162 functions to receive information about the velocity of the vehicle or information about the external brightness value of the vehicle.

Figure 2:
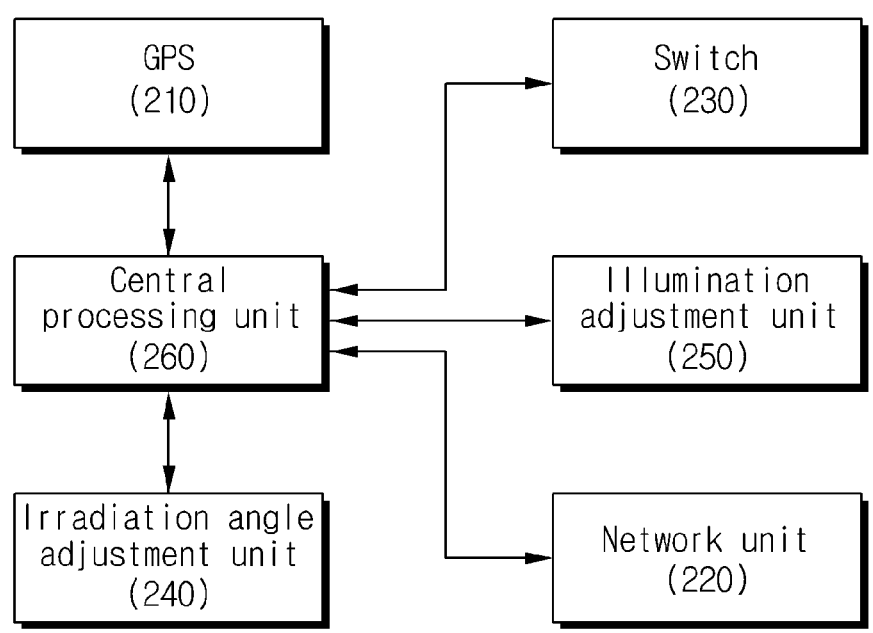
FIG. 2 is an exemplary diagram of a room lamp control apparatus.

Next, the room lamp control apparatus 100 will be described using an exemplary embodiment. FIG. 2 is an exemplary diagram of the room lamp control apparatus 100. The following description will be made with reference to FIG. 2.

FIG. 2 illustrates a smart room lamp for a vehicle. In the exemplary embodiment, the smart room lamp 200 for the vehicle may be defined to collect a current time or a driving velocity of the vehicle using a GPS installed in a room lamp, and to adjust turn-on/turn-off, a brightness, and an irradiation direction of the room lamp that may interfere with a driver driving by referring to the collected driving velocity of the vehicle and external brightness using a vehicle network (CAN), thereby providing an environment such that the driver may perform safe driving. Hereinafter, an operation of the smart room lamp 200 will be described.

A GPS 210 provides the driving velocity of the vehicle and current time information. A network unit 220 receives the driving velocity of the vehicle and external brightness information over a network, or receives a message for controlled a room lamp by an apparatus of another vehicle. A switch 230 enables a user to control the room lamp. An irradiation angle adjustment unit 240 adjusts an irradiation angle of the room lamp. The illumination adjustment unit 250 adjusts the illumination of the room lamp. A central processing unit 260 controls the overall operation of each of the units that constitute the smart room lamp 200.

The GPS 210 and the network unit 220 do not interact with each other and can be configured using only one of two blocks. The smart room lamp 200 prevents light of the room lamp from being transferred to the driver by receiving the driving velocity of the vehicle and information about the current time or the external brightness from the GPS 210 or the network unit 220, and by adjusting the illumination and the irradiation angle of the room lamp via the irradiation angle adjustment unit 240 and the illumination adjustment unit 250 when the light of the room lamp affects safe driving of the vehicle based on a turned-on switch, the vehicle being driven, and information about the current time or the external brightness.

Next, a room lamp control method of the room lamp control apparatus 100 according to an exemplary embodiment of the present invention will be described. FIG. 3 is a flowchart illustrating a method of controlling a room lamp according to an exemplary embodiment of the present invention. The following description will be made with reference to FIG. 3.

Initially, the room lamp state determining unit 110 determines whether a room lamp of a vehicle being driven is turned on (S300, room lamp state determining operation). Room lamp state determining operation S300 may determine whether the room lamp is turned on based on at least one of a result value that is input after a person who is riding in the vehicle being driven verifies whether the room lamp is turned on, and a result value that is obtained by sensing a current state of a switch that is used when turning on or turning off the room lamp.

Next, when the room lamp is turned on, the room lamp control determining unit 120 determines whether to control the room lamp of the vehicle based on first information associated with the vehicle or second information associated with an ambient environment (S310, room lamp control determining operation). Room lamp control determining operation S310 may use a velocity of the vehicle as the first information and may use an external brightness value of the vehicle or a current time as the second information.

Next, when controlling of the room lamp is required, the room lamp control unit 130 controls the room lamp by controlling a driver who drives the vehicle not to recognize that the room lamp is turned on (S320, room lamp control operation). In the exemplary embodiment, room lamp control operation S320 may include at least one of turn-off operation S320a, irradiation angle change operation S320b, and illumination adjustment operation S320c. Turn-off operation S320a is an operation of turning off the room lamp and turns off the room lamp according to control of the turn-off control unit 131a that is configured to control turn-off of the room lamp. Irradiation angle change operation S320b is an operation of changing the irradiation angle of the room lamp and changes the irradiation angle of the room lamp according to control of the irradiation angle change unit 131b that is configured to change the irradiation angle of the room lamp. Irradiation angle change operation S320b may change the irradiation angle of the room lamp into another direction until a light of the room lamp does not reach a visual field of the driver viewing in one direction any more. Illumination adjustment operation S320c is an operation of adjusting the illumination of the room lamp and adjusts the illumination of the room lamp according to control of the illumination adjustment control unit 133a that is configured to adjust the illumination of the room lamp.

In the meantime, when using the velocity of the vehicle as the first information, the room lamp control operation S320 may change an irradiation angle level of the room lamp or may adjust an illumination level of the room lamp based on a position of an acceleration value that is based on at least one predetermined reference value, or based on whether a current velocity value is within a predetermined reference range compared to a previous velocity value.

Meanwhile, in the exemplary embodiment, a GPS information receiving operation or a CAN information receiving operation may be configured as an intermediate operation between room lamp state determining operation S300 and room lamp control determining operation S310. The GPS information receiving operation is an operation of receiving information about the velocity of the vehicle as the first information and receiving information about the current time as the second information using a GPS. The CAN information receiving operation is an operation of receiving information about the velocity of the vehicle as the first information and information about the external brightness value of the vehicle as the second information using a CAN.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for controlling an interior lamp, the apparatus comprising:
    an interior lamp state determining unit configured to determine whether an interior lamp of a vehicle being driven is turned on;
    an interior lamp control determining unit configured to determine whether to control the interior lamp of the vehicle based on first information associated with the vehicle and second information associated with an ambient environment, when the interior lamp is determined to be turned on; and
    an interior lamp control unit configured to change an irradiation angle or an illumination level of the interior lamp to thereby avoid interference of the light from the interior lamp with a driver who is driving the vehicle when the interior lamp is on, when controlling of the interior lamp is determined to be required.

2. The apparatus of claim 1, wherein the interior lamp control unit includes an irradiation angle change unit to change the irradiation angle of the interior lamp.

3. The apparatus of claim 2, wherein the irradiation angle change unit changes the irradiation angle of the interior lamp into another direction until a light of the interior lamp does not reach a visual field of the driver viewing in one direction any more.

4. The apparatus of claim 2, wherein the interior lamp control unit further includes an illumination adjustment unit to adjust the illumination level of the interior lamp.

5. The apparatus of claim 1, wherein the interior lamp control determining unit uses a velocity of the vehicle as the first information and uses an external brightness value of the vehicle or a current time as the second information.

6. The apparatus of claim 5, wherein when using the velocity of the vehicle as the first information, the interior lamp control unit changes the irradiation angle level of the interior lamp or adjusts the illumination level of the interior lamp based on a position of an acceleration value that is based on at least one predetermined reference value, or based on whether a current velocity value is within a predetermined reference range compared to a previous velocity value.

7. The apparatus of claim 5, further comprising:
    a global positioning system (GPS) communication unit to receive information about the velocity of the vehicle or information about the current time; or
    a controller area network (CAN) communication unit to receive information about the velocity of the vehicle or information about the external brightness value of the vehicle.

8. The apparatus of claim 1, wherein the interior lamp state determining unit determines whether the interior lamp is turned on based on a result value that is input after a person who is riding in the vehicle being driven verifies whether the interior lamp is turned on, or a result value that is obtained by sensing a current state of a switch that is used when turning on or turning off the interior lamp.

9. The apparatus of claim 1, wherein the interior lamp control apparatus is mounted within the interior lamp.

10. The apparatus of claim 1, wherein if the light of the interior lamp reaches a visual field of the driver, the interior lamp control unit adjusts the illumination level or irradiation angle of the interior lamp until the light of the interior lamp does not reach the visual field of the driver, when controlling the interior lamp is determined to be required.

11. A method for controlling an interior lamp, the method comprising:
    determining whether an interior lamp of a vehicle being driven is turned on;
    determining whether to control the interior lamp of the vehicle based on first information associated with the vehicle and second information associated with an ambient environment, when the interior lamp is determined to be turned on; and
    controlling the interior lamp by changing an irradiation angle or an illumination level of the interior lamp to thereby avoid interference of the light from the interior lamp with a driver who is driving the vehicle when the interior lamp is on, when controlling of the interior lamp is determined to be required.

12. The method of claim 11, wherein determining whether to control the interior lamp includes using a velocity of the vehicle as the first information and using an external brightness value of the vehicle or a current time as the second information.

13. The method of claim 12, wherein when using the velocity of the vehicle as the first information, controlling the interior lamp includes changing the irradiation angle level of the interior lamp or adjusting the illumination level of the interior lamp based on a position of an acceleration value that is based on at least one predetermined reference value, or based on whether a current velocity value is within a predetermined reference range compared to a previous velocity value.

14. The method of claim 11, wherein determining whether the interior lamp is turned on is based on at least one of a result value that is input after a person who is riding in the vehicle being driven verifies whether the interior lamp is turned on, or a result value that is obtained by sensing a current state of a switch that is used when turning on or turning off the interior lamp.

15. The method of claim 11, further comprising:
    receiving information about the velocity of the vehicle as the first information and information about the current time as the second information using a global positioning system (GPS); or
    receiving information about the velocity of the vehicle as the first information and information about the external brightness value of the vehicle as the second information using a controller area network (CAN).

16. A method for controlling an interior lamp, the method comprising:
    determining whether an interior lamp of a vehicle being driven is turned on;
    determining whether to control the interior lamp of the vehicle based on first information associated with the vehicle or second information associated with an ambient environment, when the interior lamp is turned on; and
    controlling the interior lamp in order that the light from the interior lamp not interfere with a driver who drives the vehicle when the interior lamp is turned on, when controlling of the interior lamp is required, wherein controlling the interior lamp includes at least one of,
        turning off the interior lamp,
        changing an irradiation angle of the interior lamp, and
        adjusting illumination of the interior lamp,
    wherein changing an irradiation angle of the interior lamp includes changing the irradiation angle of the interior lamp into another direction until a light of the interior lamp does not reach a visual field of the driver viewing in one direction any more.

\* \* \* \* \*